(12) United States Patent
Berkoff et al.

(10) Patent No.: US 8,856,651 B2
(45) Date of Patent: Oct. 7, 2014

(54) REMOTE USER INTERFACE COOPERATIVE APPLICATION

(75) Inventors: Russell A. Berkoff, Sunnyvale, CA (US); Alan Messer, Los Gatos, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 236 days.

(21) Appl. No.: 12/794,641

(22) Filed: Jun. 4, 2010

(65) Prior Publication Data

US 2011/0302492 A1    Dec. 8, 2011

(51) Int. Cl.
| G06F 3/14 | (2006.01) |
| G06F 9/44 | (2006.01) |
| H04N 21/436 | (2011.01) |
| H04N 21/47 | (2011.01) |

(52) U.S. Cl.
CPC ........ *G06F 9/4445* (2013.01); *H04N 21/43615* (2013.01); *H04N 21/47* (2013.01)
USPC ........... 715/709; 715/700; 709/227; 709/231; 726/5

(58) Field of Classification Search
USPC .......... 715/200–277, 700–867; 700/701–866; 709/201–229; 705/50–79; 345/30–111
See application file for complete search history.

(56) References Cited

U.S. PATENT DOCUMENTS

| 2003/0061355 A1* | 3/2003 | Yang et al. .................... 709/227 |
| 2005/0086344 A1 | 4/2005 | Suesserman |
| 2006/0174026 A1* | 8/2006 | Robinson et al. ............. 709/231 |
| 2008/0155663 A1* | 6/2008 | Knowlson et al. ................. 726/5 |
| 2008/0243998 A1 | 10/2008 | Oh et al. |
| 2009/0187618 A1 | 7/2009 | Maeng et al. |
| 2009/0265648 A1 | 10/2009 | Ryu et al. |

FOREIGN PATENT DOCUMENTS

| CN | 1466332 A | 1/2004 |
| CN | 1879355 A | 12/2006 |
| JP | 10191463 A | 7/1998 |
| JP | 2005141360 A | 6/2005 |
| JP | 2006323597 A | 11/2006 |
| JP | 2007149052 A | 6/2007 |
| JP | 2007267102 A | 10/2007 |
| WO | 0058855 A1 | 10/2000 |

OTHER PUBLICATIONS

International Search Report dated Dec. 28, 2011 from International Application No. PCT/KR2011/004085.

Japanese Office Action dated Nov. 26, 2013 for Japanese Application No. 2013-513117 from Japan Patent Office, pp. 1-9, Tokyo, Japan (Machine-generated English-language translation attached, pp. 1-6).

(Continued)

*Primary Examiner* — Ruay Ho
(74) *Attorney, Agent, or Firm* — Kenneth L. Sherman, Esq.; Michael Zarrabian, Esq.; Sherman & Zarrabian LLP

(57) ABSTRACT

In a first embodiment of the present invention, a method for operating a remote user interface (UI) client is provided, the method comprising: establishing a first connection with a UI server; receiving a document over the first connection; closing the first connection; running the document, wherein the document contains first instructions on how to operate a user interface and second instructions on establishing a persistent connection with the UI server; and establishing a second connection with the UI server based on the second instructions.

25 Claims, 10 Drawing Sheets

(56) References Cited

OTHER PUBLICATIONS

European Search Report dated Mar. 14, 2014 for European Patent Application No. 11790042.3 from European Patent Office, pp. 1-9, Munich, Germany.

Chinese Office Action dated Jul. 22, 2014 for Chinese Patent Application No. 201180027320.0 from Chinese Patent Office, pp. 1-6, Beijing, China [Machine-generated English-language Translation, pp. 1-7].

* cited by examiner

REMOTE USER INTERFACE COOPERATIVE APPLICATION

BACKGROUND OF THE INVENTION

1. Field of the Invention

The present invention relates generally to remote user interfaces. More specifically, a cooperative application for remote user interfaces is described.

2. Description of the Related Art

Remote user interfaces (UIs) are becoming important in various consumer electronics (CE) devices because they permit a remote device to display a user interface for an application that it does not host. For example, in a home setting, a host (e.g. a set top box) located in one room may be arranged to deliver content over a home network to multiple devices including devices that may be located in other rooms within the house. In such settings, it is desirable for a user to be able to interact with the host device through a user interface displayed on the remote device.

To date, there have been a number of different efforts to define standards for developing remote user interfaces. Presently, no one remote UI standard works for all situations. Streaming bitmap remote UIs (Intel's XRT, VNC, JPEG2000, etc.) all require a special client in order to decode the stream. Hypertext Markup Language (HTML) UIs work for UIs that can be described in HTML, but have difficulty handling UIs that are not readily described using HTML. Video based UIs require expensive video encoders on the server side to create the UI in the first place.

The Consumer Electronics Association (CEA) has a standardization initiative—CEA 2014-A—that is intended to define a web-based protocol and framework for facilitating remote user interfaces. The CEA 2014-A standard defines the mechanisms necessary to allow a user interface to be remotely displayed on and controlled by devices or control points other than the one hosting the underlying logic. The basic device discovery is based on the Universal Plug and Play (UPnP) Device Architecture for UPnP networks and UPnP devices in the home. The standard also allows the remote display of user interfaces provided by third party internet services on UPnP devices in the home, and covers a wide range of UI capabilities for TVs, mobile phones and portable devices.

Browser based remote user interface systems (such as CEA 2014) typically use HTML to create user interfaces on remote devices in much the same way that web pages are created on a PC screen. In this model, the UI server (e.g., set-top box) and the UI client (e.g., television) are both clients on a network (connected via wired/wireless Ethernet, home-plug, or other similar networking technology). Network technologies, however, do not typically maintain continuous connections between devices, so network based technologies usually send bundles of instructions to the UI client and then the UI client operates largely autonomously.

The model for set-top boxes prior to the introduction of remote user interfaces, however, was for the set-top box to maintain continuous control of the display device. Such continuous control is not possible in existing remote user interface systems.

SUMMARY OF THE INVENTION

In a first embodiment of the present invention, a method for operating a remote user interface (UI) client is provided, the method comprising: establishing a first connection with a UI server; receiving a document over the first connection; closing the first connection; running the document, wherein the document contains first instructions on how to operate a user interface and second instructions on establishing a persistent connection with the UI server; and establishing a second connection with the UI server based on the second instructions.

In a second embodiment of the present invention, a method for operating a remote user interface (UI) server is provided, the method comprising: establishing a first connection with a UI client; sending a document to the UI client over the first connection, wherein the document contains first instructions on how to operate a user interface and second instructions on establishing a persistent connection with the UI server; closing the first connection; receiving a request from the UI client for a persistent connection; and establishing a second connection with the UI client, wherein the second connection is a persistent connection.

In a third embodiment of the present invention, an apparatus is provided comprising: a processor; an interface; and a UI client, wherein the UI client is configured to: establish a first connection with a UI server via the interface; receive a document over the first connection through the interface; close the first connection; run the document by executing instructions from the document using the processor, wherein the document contains first instructions on how to operate a user interface and second instructions on establishing a persistent connection with the UI server; and establish a second connection with the UI server via the interface based on the second instructions.

In a fourth embodiment of the present invention, an apparatus is provided comprising: a processor; an interface; and a UI server, wherein the UI server is configured to: establish a first connection with a UI client via the interface; send a document to the UI client over the first connection through the interface, wherein the document contains first instructions on how to operate a user interface and second instructions on establishing a persistent connection with the UI server; close the first connection; receive a request via the interface from the UI client for a persistent connection; establish a second connection with the UI client via the interface, wherein the second connection is a persistent connection; and directly edit the document on the UI client by using the processor to generate instructions that are sent over the interface.

In a fifth embodiment of the present invention, a program storage device readable by a machine is provided, tangibly embodying a program of instructions executable by the machine to perform a method for operating a remote user interface (UI) client, the method comprising: establishing a first connection with a UI server; receiving a document over the first connection; closing the first connection; running the document, wherein the document contains first instructions on how to operate a user interface and second instructions on establishing a persistent connection with the UI server; and establishing a second connection with the UI server based on the second instructions.

In a sixth embodiment of the present invention, a program storage device readable by a machine is provided, tangibly embodying a program of instructions executable by the machine to perform a method for operating a remote user interface (UI) server, the method comprising: establishing a first connection with a UI client; sending a document to the UI client over the first connection, wherein the document contains first instructions on how to operate a user interface and second instructions on establishing a persistent connection with the UI server; closing the first connection; receiving a request from the UI client for a persistent connection; and establishing a second connection with the UI client, wherein the second connection is a persistent connection.

DETAILED DESCRIPTION OF SPECIFIC EMBODIMENTS

Figure 1:
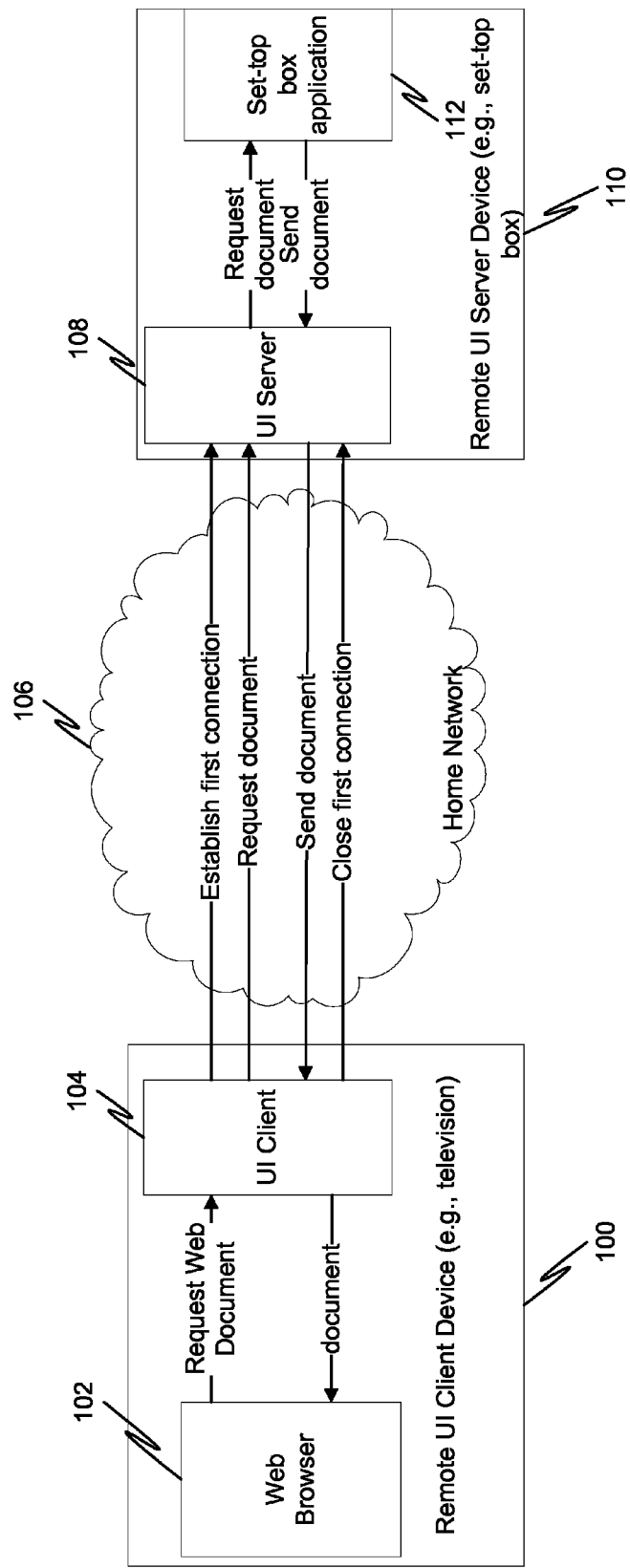
FIG. 1 is a block diagram illustrating a system for remote UI cooperation in accordance with an embodiment of the present invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In one embodiment of the present invention, extensions are provided to a web based UI model to accommodate the migration of software stacks from a UI server to the UI client.

In the current UI model, a remote UI client is responsible for executing a document that encapsulates both server application logic as well as the desired client-side end-user UI behavior. In this model, the remote UI server is frequently relegated to the role of a backend database that simply provides information to the remote UI client.

In an embodiment of the present invention, a cooperative model is provided. In the cooperative model, the UI server continues to interact with the UI client even after the UI client loads the document. The initial document loaded into the UI client may contain code that causes the UI client to request a persistent connection with the UI server. Commands and responses between the UI client and the UI server can then be sent over this connection.

In one embodiment of the present invention, the server can directly submit, delete, and/or modify the document, such as by modifying Extensible Hypertext Markup Language (XHTML)/Scalable Vector Graphics (SVG) markup elements contained in the document. In other words, the UI server can directly edit elements of the document. This allows much more control to be placed in the hands of the UI server than typical remote UI systems, although this particular embodiment would require that the UI server be able to edit the elements in the underlying language of the elements (e.g., it must contain enough knowledge about XHTML/SVG to edit an XHTML/SVG element).

In an alternative embodiment, the server can submit, delete, and/or modify drawing primitives, which the client can convert into declarative elements, such as XHTM/SVG markup elements. In this embodiment, the client can maintain a mapping between the submitted drawing primitives and the generated XHTML/SCG element. In other words, the UI server can indirectly edit elements of the document. This particular embodiment gives up some of the direct control of the previous embodiment, but it eliminates the need for the UI server to be able to edit the elements in the underlying language of the elements.

The UI server can also submit scripting objects (e.g., EXMAScript objects) to allow the client to control and/or modify the attributes of submitted drawing primitives and declarative elements as well as to handle user-input events.

In an alternative embodiment of the present invention, in the context of markup languages, the server may directly access and/or modify a Document Object Model (DOM) tree running on the client by using a DOM core interface. The DOM tree is a hierarchical representation of the elements of a document. The ability to directly modify the DOM tree provides an unprecedented level of control to the UI server.

FIG. 1 is a block diagram illustrating a system for remote UI cooperation in accordance with an embodiment of the present invention. Here, a remote UI client device, such as a digital television 100 contains a web browser application 102 and a UI client 104. It should be noted that while a digital television 100 is depicted in FIG. 1, one of ordinary skill in the art will recognize that the UI client can be located on any type of device, and the claims should not be limited to digital televisions unless expressly stated. Additionally, the web browser application 102 is merely one example of an application that can utilize a document downloaded via the UI client. One of ordinary skill in the art will recognize that other applications could be used to run the document, and the claims should not be limited to web browsers unless expressly stated. For purposes of this disclosure, the term "client user agent" shall be construed as being any one of these various types of client UI applications.

A home network 106 may connect the UI client 104 to a UI server 108 operating on a remote UI server device, such as a set-top box 110. The set-top box 110 may additionally contain a set-top box application 112 that provides services hosted by the set-top box. While not pictured, both the remote UI client device 100 and the remote UI server device 110 may contain a processor and an interface. The processors may be used to execute various instructions relating to the processes described in this disclosure, while the interface may be used to communicate between the remote UI client device 100 and the remote UI server device 110. Like with the web browser, the set-top box application is merely one example of an application that can generate and/or modify a document. One of ordinary skill in the art will recognize that other applications could be used for these purposes, and the claims should not be limited to set-top box applications unless expressly stated. For purpose of this disclosure, the term "host software" shall be construed as being any one of these various types of server UI applications.

Also depicted in FIG. 1 is the fact that the web browser application 102 requests a document. This request is passed to UI client 104. The UI client 104 then establishes a connection with the UI server 108. This establishing of a connection may be performed in accordance with industry standards. It should be noted that the establishing of a connection usually involves actions taken place on both the UI client and the UI server, thus it can be viewed as either the UI client, the UI server, or both performing the act of establishing the connection. When it is stated that the UI client establishes the connection, it is assumed that this involves the performing of the actions on the UI client-side that are required to set up the connection. Likewise when it is stated that the UI server establishes the connection, it is assumed that this involves the performing of the actions on the UI server-side that are required to set up the connection.

The UI client 104 requests a document (e.g., a CE-HTML page) from the UI server 108 over the first connection. The UI server 108 notifies the host software 112 of an attempted connection to the application. The UI server 108 responds to the UI client request by generating a response document and passing this document to UI client 104, which forwards it to the web browser application 102. The UI client 104 may then close the connection to the UI server 108.

Figure 2:
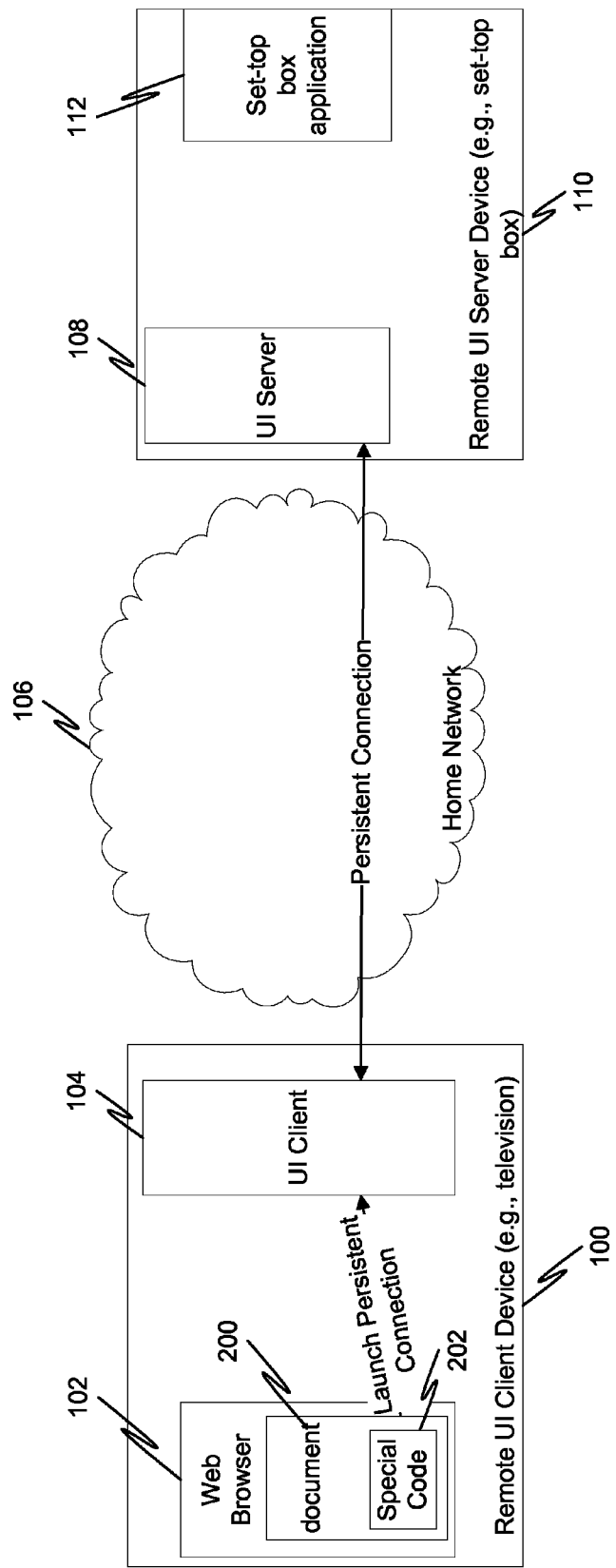
FIG. 2 is a block diagram illustrating the system of FIG. 1 as subsequent steps are taken, in accordance with an embodiment of the present invention.

At this point, the web browser application 102 has received the document and the connection between the UI client and the UI server has been closed. FIG. 2 is a block diagram illustrating the system of FIG. 1 as subsequent steps are taken, in accordance with an embodiment of the present invention. As can be seen in this figure, the document 200 contains special code 202 designed to cause the web browser application 102 to cause the UI client 104 to establish a new connection with the UI server 108. This new connection will be a persistent one.

The term "persistent connection" as used in this patent document shall be construed as meaning any connection that remains open following an initial data transfer. While this may include connections where there is continuous data transfer between the UI client and the UI server, it is not necessary for the connection to be constantly busy in order for it to be transparent. It is enough that the connection is left open for subsequent data transfers (e.g., link negotiation need not be performed again when a data transfer occurs).

The UI server 108 may also request that the UI client 104 provide device capabilities, such as screen resolution, so that the set top box application 112 may better craft any modifications made to the document in subsequent steps.

Figure 3:
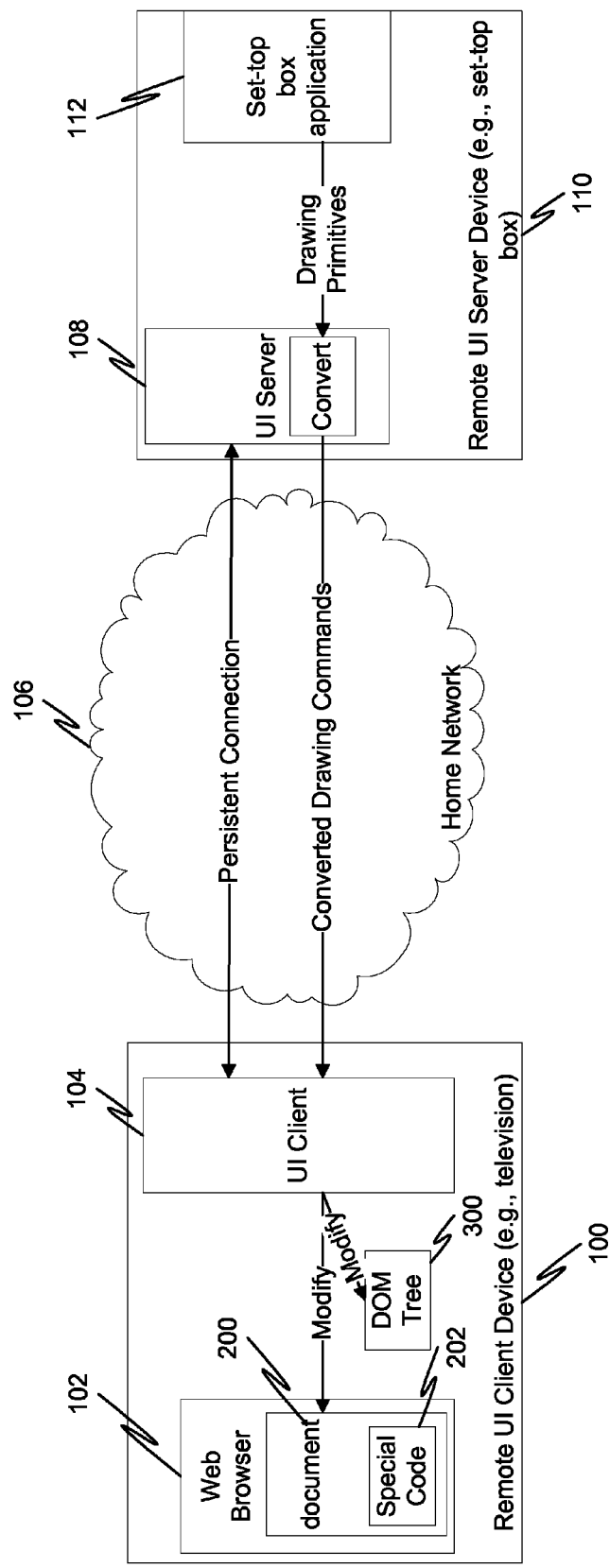
FIG. 3 is a block diagram illustrating the system of FIG. 2 as subsequent steps are taken, in accordance with one embodiment of the present invention.

At this point, the second connection, a persistent connection, has been established between the UI client 104 and the UI server 108. FIG. 3 is a block diagram illustrating the system of FIG. 2 as subsequent steps are taken, in accordance with one embodiment of the present invention. In this embodiment, the set-top box application 112 wishes to modify the UI on the digital television 100. First, the set-top box application 112 generates new drawing primitives/drawing group commands and passes them to the UI server 108. The UI server 108 converts these commands to a format supported by the document, such as XHTML/SVG markup commands. The UI server 108 then passes these converted commands to the UI client 104, which acts to update the document, either directly or by modifying a DOM tree 300 associated with the document.

Figure 4:
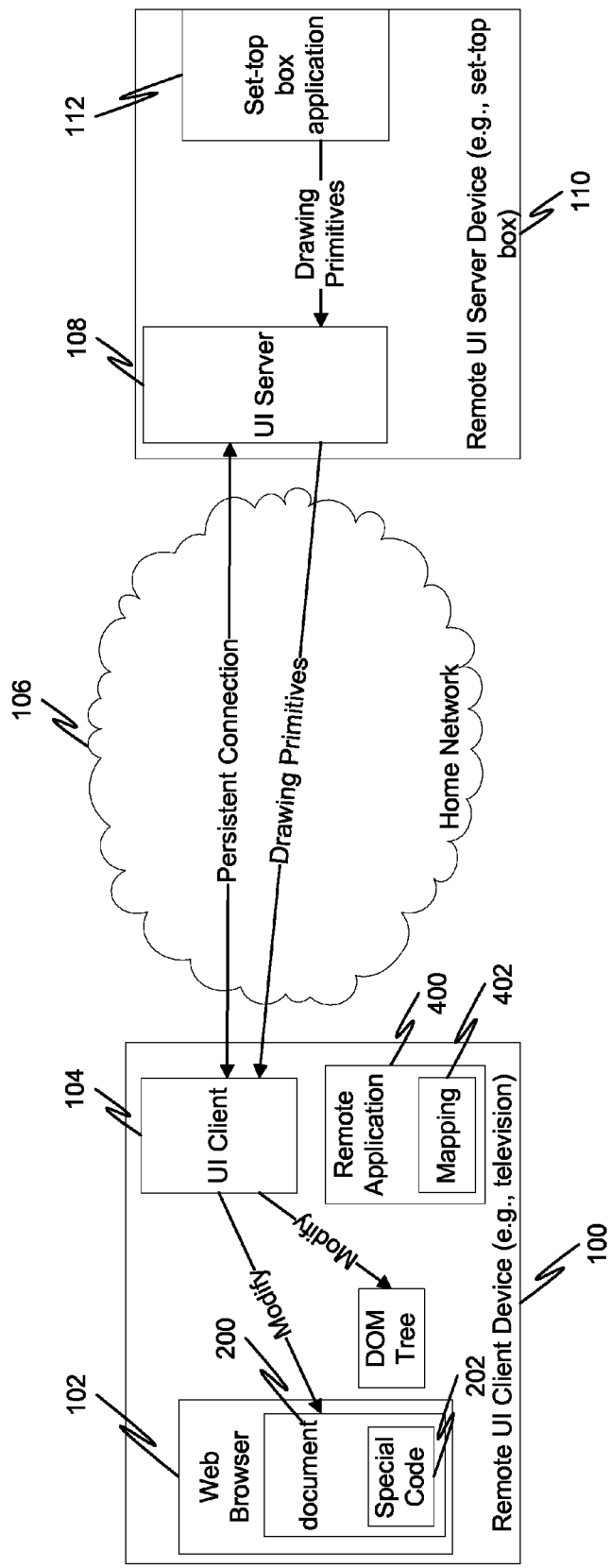
FIG. 4 is a block diagram illustrating the system of FIG. 2 as subsequent steps are taken, in accordance with an alternative embodiment of the present invention.

FIG. 4 is a block diagram illustrating the system of FIG. 2 as subsequent steps are taken, in accordance with an alternative embodiment of the present invention. In this embodiment, the set-top box application 112 again wishes to modify the UI on the digital television 100, but here instead of performing a conversion of drawing primitives/drawing group commands at the UI server 108, the conversion occurs at the UI client 104, which may invoke a remote application agent 400 to perform the conversions and insert the new markup into the DOM tree. The remote application may also maintain a mapping 402 of drawing primitives/drawing group commands and their corresponding XHTML/SVG markup commands, in order to aid in the conversion process.

In another embodiment of the present invention, drawing primitives/groups may be associated with script handlers, such as ECMAScript event handlers contained in ECMAScript packages submitted to the client. The client ECMAScript may handle the event by modifying drawing groups or XHTML/SVG markup directly. The client may send a message to the server, which can create, modify, and/or select submitted drawing primitives/groups or XHTML/SVG markup.

Figure 5A:
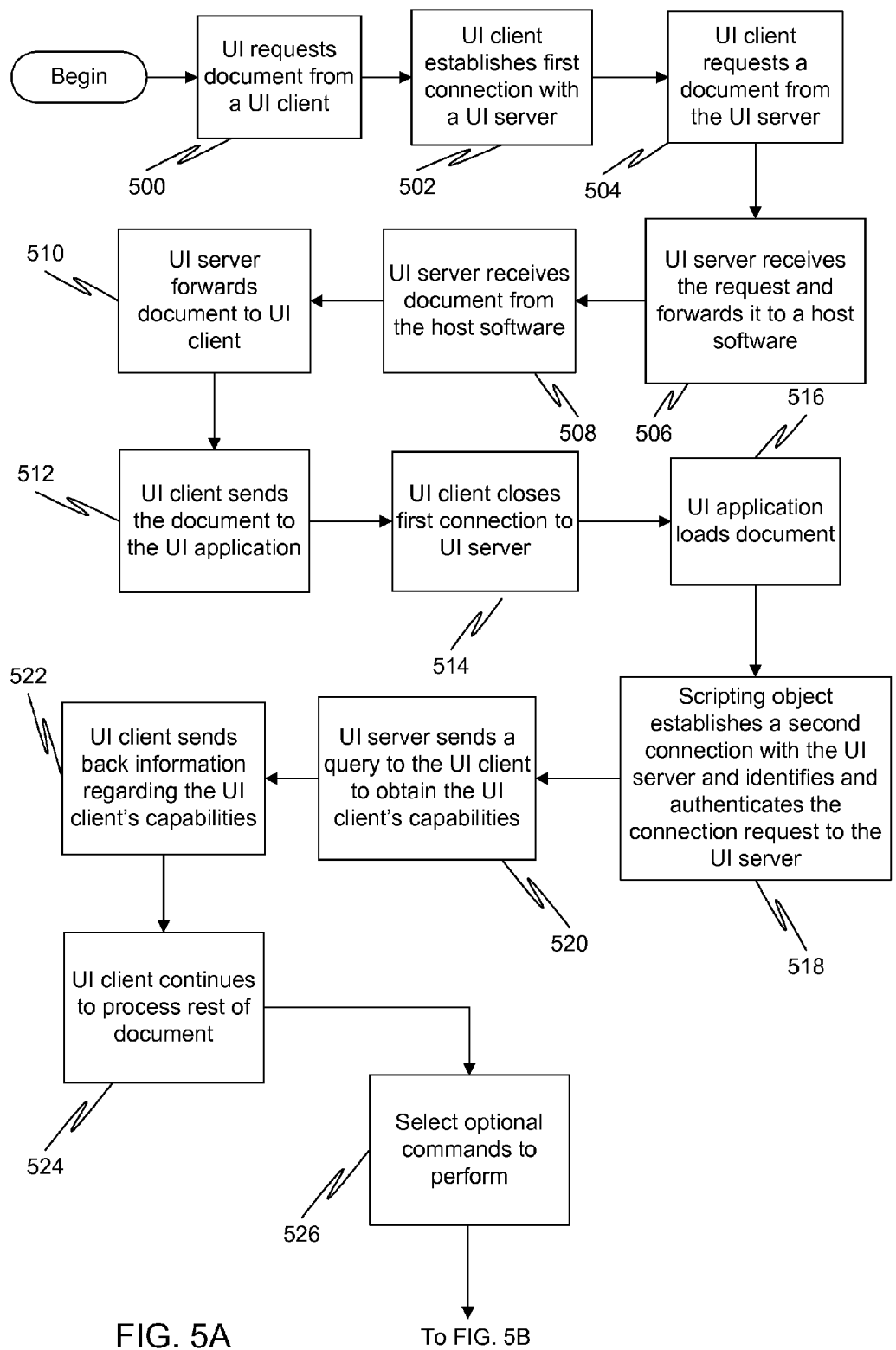
FIGS. 5A-5D are flow diagrams illustrating a method for cooperative UI modification in accordance with an embodiment of the present invention.

FIGS. 5A-5D are flow diagrams illustrating a method for cooperative UI modification in accordance with an embodiment of the present invention. Referring to FIG. 5A, at 500, a client user agent may request a document from a UI client. The client user agent may be, for example, a web application like a web browser, although embodiments are possible where the client user agent is another type of application. At 502, the UI client establishes a first connection with a UI server. At 504, the UI client requests a document from the UI server. At 506, the UI server receives the request and notifies the host software of a connection attempt. This may be any application hosted by the server, such as a set-top box application.

At 508, the UI server receives a document from the host software. At 510, the UI server may then forward the document to the UI client. At 512, the UI client sends the document to the client user agent. At 514, the UI client closes the first connection to the UI server.

At 516, the client user agent loads the document. The document may contain an element that causes the UI client to request a persistent connection with the UI server when executed. This could includes, for example, an <object> element with type="application/remote_application". The <object> element may also contain details for the server to identify the connection request, using <param> child elements. The <object> element may cause a scripting object built into the UI client to be invoke. At 518, the scripting object may establish a second connection, such as a Transmission Control Protocol (TCP) connection, with the UI server and identify and authenticate the connection request to the UI server. In one embodiment of the present invention, requests and responses from the UI server to the UI client may be performed using Simple Object Access Protocol (SOAP) protocols over the connection established between the UI client and the UI server.

At 520, the UI server can send a query to the UI client to obtain the UI client's capabilities. At 522, the UI client may send back information regarding the UI client's capabilities. This information allows the document application to be knowledgeable enough about the device and application running the UI on the UI client in order to make intelligent decisions on how to modify the UI. At 524, the UI client may continue to process the rest of the document.

Figure 5B:
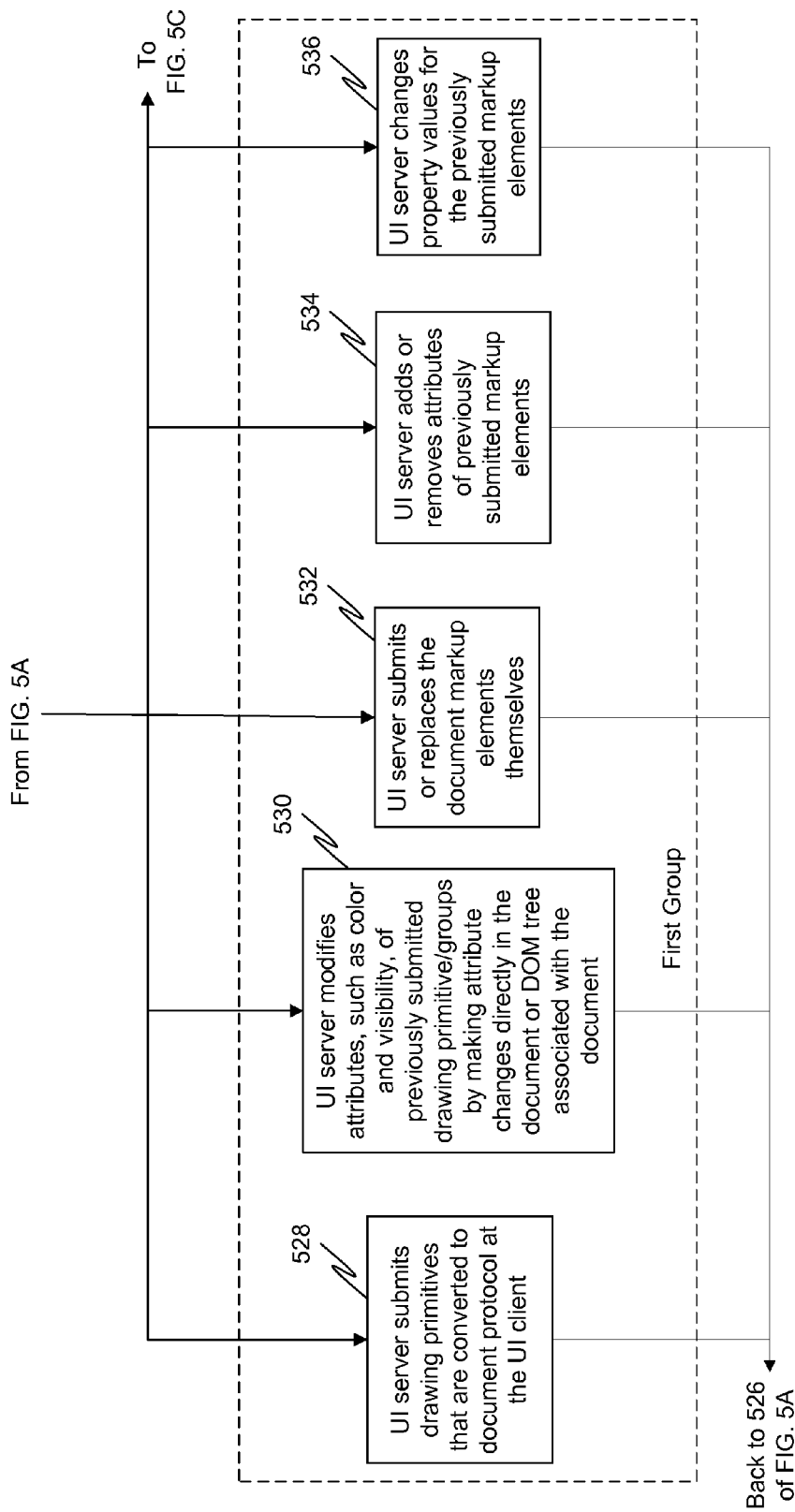
Figure 5C:
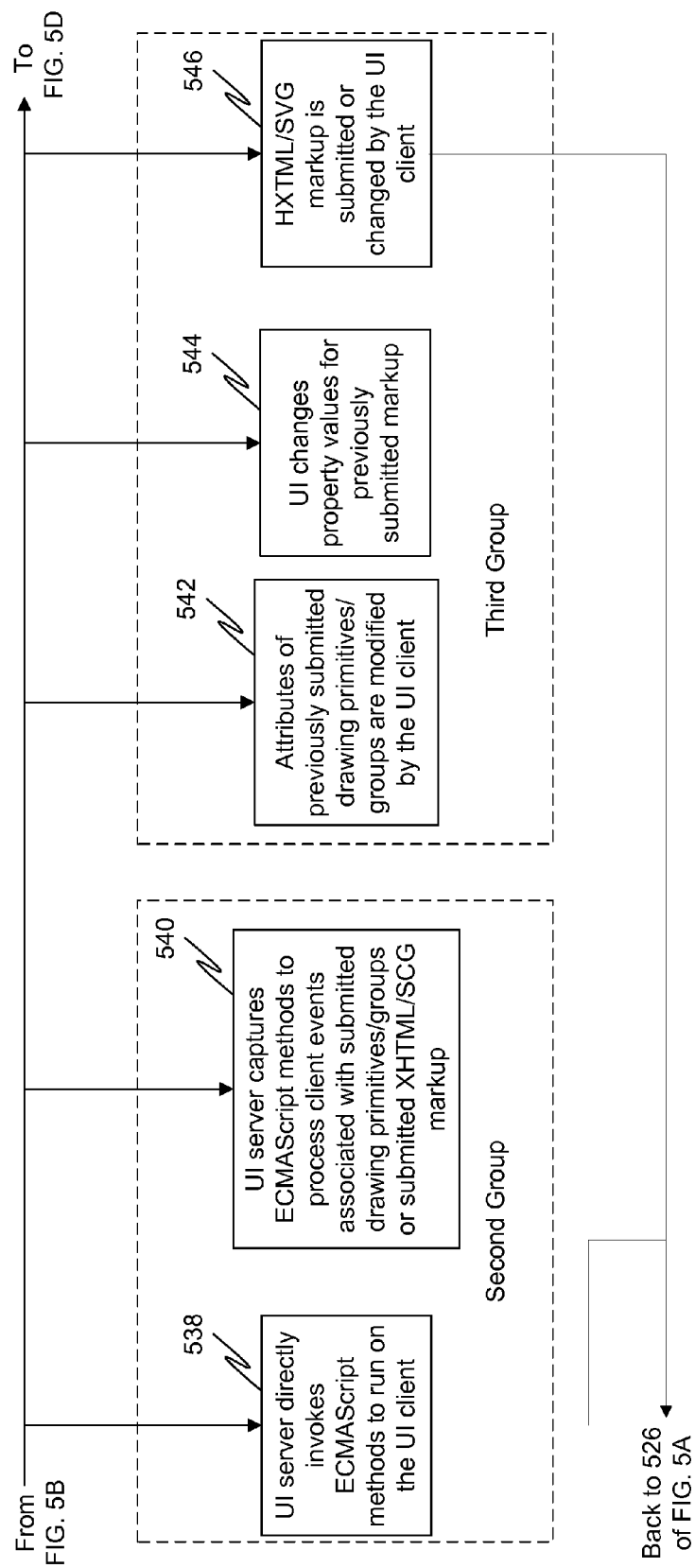
Figure 5D:
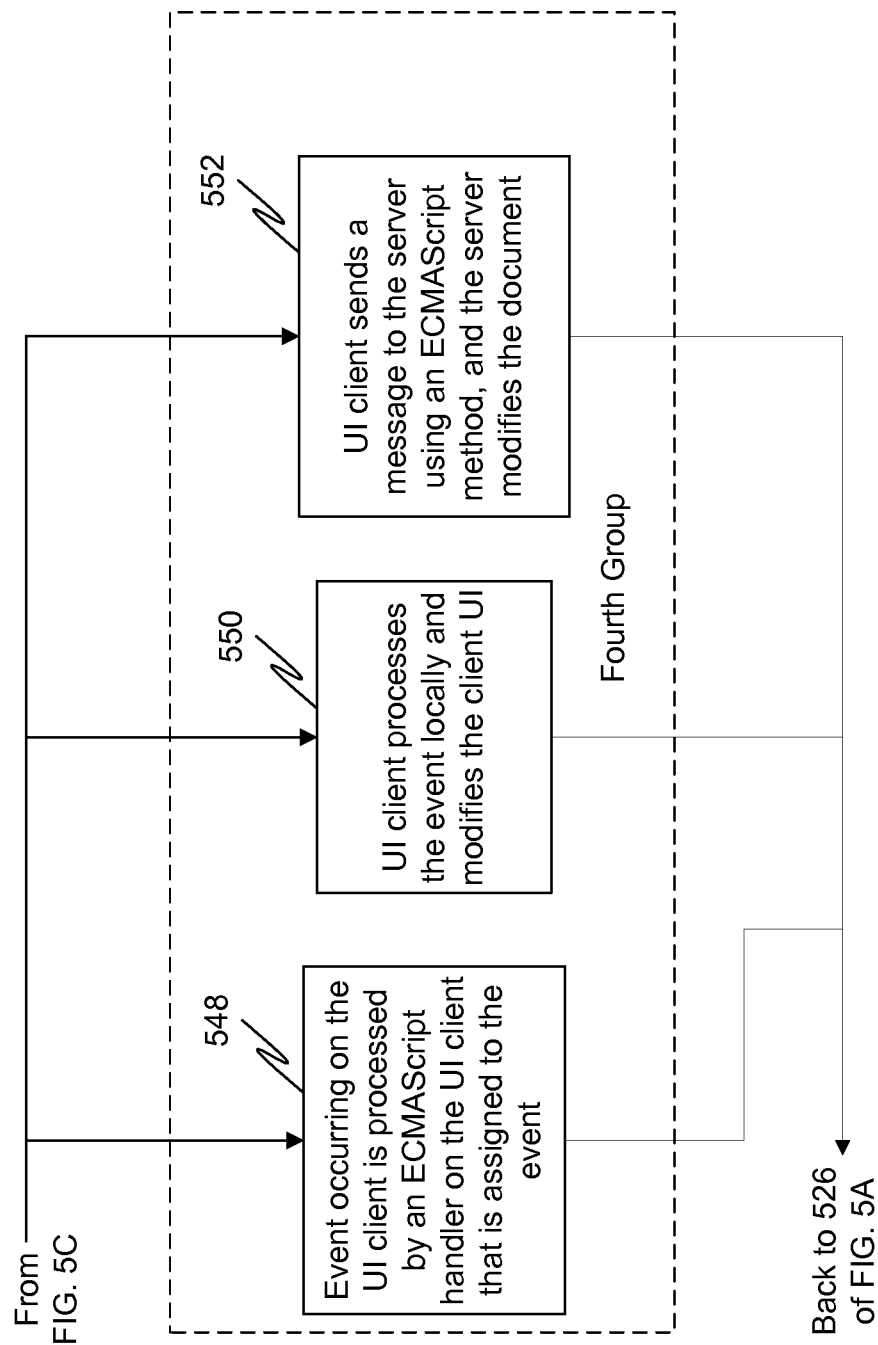

At this point, at 526, the UI server (and UI client) have many options on how to update the UI, which can be performed at anytime over the second connection, which is a persistent connection. Some example alternatives are shown in FIGS. 5B-5D. Referring to FIG. 5B, a first group of alternatives pertain to the server updating the client UI state. At 528, the UI server may submit drawing primitives that are converted to document protocol at the UI client. At 530, the UI server may modify attributes, such as color and visibility, of previously submitted drawing primitive/groups by making attribute changes directly in the document or DOM tree associated with the document. At 532, the UI server may submit or replace the document markup elements themselves. At 534, the UI server may add or remove attributes of previously submitted markup elements. At 536, the UI server may change property values for the previously submitted markup elements.

Referring to FIG. 5C, a second group of alternatives pertain to the server submitting script packages to the client. At 538, the UI server may directly invoke ECMAScript methods to run on the UI client. At 540, the UI server may capture ECMAScript methods to process client events associated with submitted drawing primitives/groups or submitted XHTML/SVG markup. This may include submitting an ECMAScript routine for the client to run that would direct the client to send selected events to the ECMAScript route. The ECMAScript routine event handler could then process the captured event locally or notify the UI server. The ECMAScript methods running on the UI client may send messages to the server.

A third group of alternatives pertain to the client updating its own UI state. At 542, attributes, such as color and visibility, of previously submitted drawing primitives/groups may be modified by the UI client. At 544, property values for previously submitted markup may be changed by the UI client. At 546, XHTML/SVG markup may be submitted or changed by the UI client.

Referring to FIG. 5D A fourth group of alternatives pertain to event handling. At 548, an event occurring on the UI client are processed by an ECMAScript handler on the UI client that is assigned to the event. At 550, the UI client may process the event locally and modify the client UI as described above with respect to steps 542-546. Alternatively, at 552, the UI client may send a message to the server using an ECMAScript method, and the server may modify the document as described above with respect to steps 528-536.

As described above, drawing primitives/group commands may be sent to the UI client from the UI server and converted, by the client user agent, to markup commands compatible with the document format at the UI client. In this model, a graphic drawing Application Program Interface (API) may be provided to the UI server. As the commands are issued by the server, they are converted into commands compatible with the UI client. The UI client can then convert these graphic drawing commands into the corresponding markup commands. A remote application agent may maintain a mapping between the graphic drawing commands and the generated markup commands to allow the server to subsequently modify the attribute of the graphic objects that were drawn. Although this may place more demands on the UI client, it results in a server-side API that is likely closer to what a typical set-top box application is coded to expect.

The UI server may use drawing primitives (such as circle, line, rectangle, curve, and path, as well as stroke and fill attributes) to draw on a client UI device. The agent running on the client UI device converts these primitives to an acceptable markup language and inserts the markup in the client device DOM tree. Drawing groups for the primitives can also be used. Drawing groups define a set of graphic commands that are treated as a single unit. These groups may each be assigned a "z-order", which indicates a level in a hierarchy. Each group may be made visible or invisible and can be translated/rotated/scaled/faded in/out.

Figure 6:
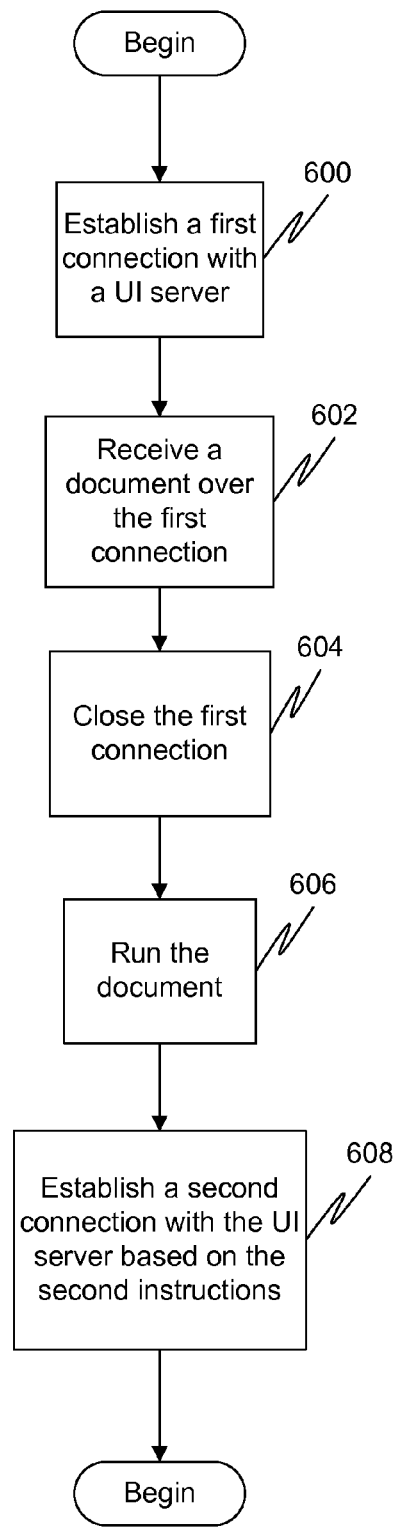
FIG. 6 is a flow diagram illustrating a method for operating a remote user interface client in accordance with an embodiment of the present invention.

FIG. 6 is a flow diagram illustrating a method for operating a remote user interface client in accordance with an embodiment of the present invention. The method may be performed on a client device, such as a display device, in a home network. At 600, a first connection is established with a UI server. At 602, a document is received over the first connection. At 604, the first connection is closed. At 606, the document is run. The document may contain first instructions on how to operate a user interface and second instructions on establishing a persistent connection with the UI server. The first instructions may contain an object that, when run, causing a scripting object in the UI client to be invoked. At 608, a second connection is established with the UI server based on the second instructions. This may include sending UI client capabilities to the UI server.

Figure 7:
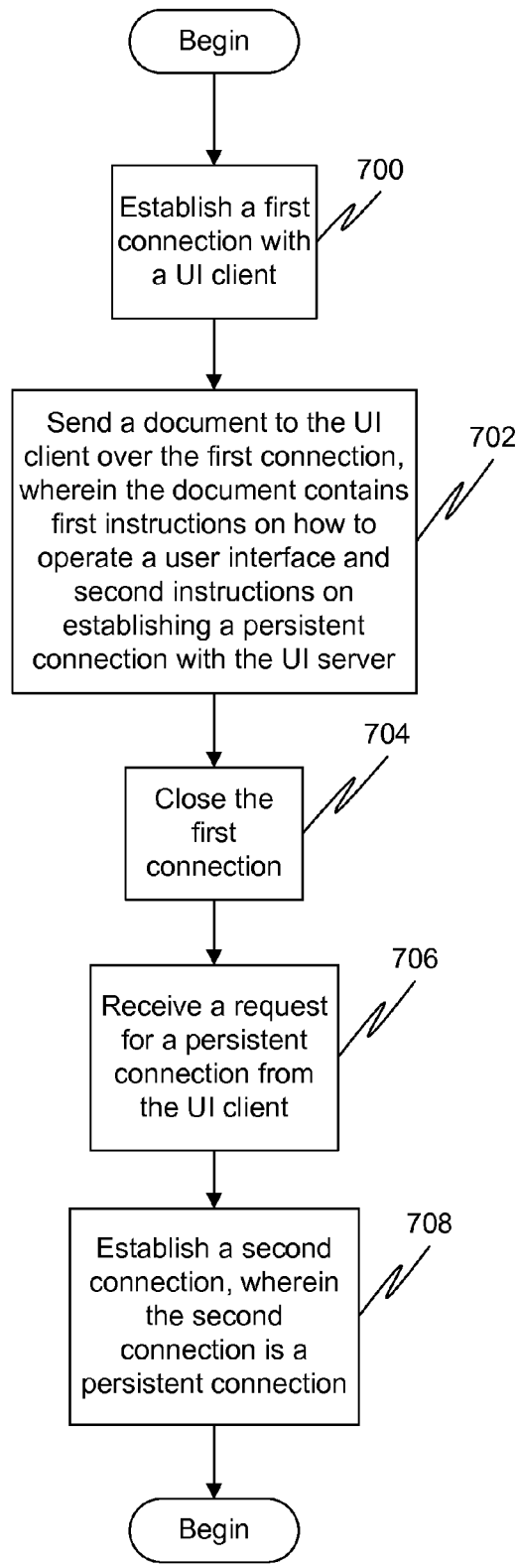
FIG. 7 is a flow diagram illustrating a method for operating a remote user interface server in accordance with an embodiment of the present invention.

FIG. 7 is a flow diagram illustrating a method for operating a remote user interface server in accordance with an embodiment of the present invention. This method may be performed on a server device, such as a set-top box, in a home network. At 700, a first connection is established with a UI client. At 702, a document is sent to the UI client over the first connection, wherein the document contains first instructions on how to operate a user interface and second instructions on establishing a persistent connection with the UI server. At 704, the first connection is closed. At 706, a request for a persistent connection is received from the UI client. At 708, a second connection with the UI client is established, wherein the second connection is a persistent connection.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method for operating a remote user interface (UI) client, the method comprising:
   establishing a first connection with a UI server;
   receiving a remote user interface document over the first connection;
   closing the first connection;
   running instructions from language contained in the remote user interface document, wherein the instructions of the remote user interface document contains first instructions on how to operate a user interface and second instructions on establishing a persistent connection with the UI server, wherein a persistent connection is a connection in which link negotiation is not required to be performed again in order to transmit subsequent data;
   updating the remote user interface document by establishing a second connection with the UI server based on the second instructions, wherein the second connection is a persistent connection that remains open after an initial data transfer; and
   receiving drawing primitives from the UI server over the second connection.

2. The method of claim 1, wherein the first instructions contain an object that, when run, causes a scripting object to be invoked.

3. The method of claim 1, further comprising:
   identifying and authenticating the second connection with the UI server; and
   sending UI client capabilities to the UI server over the second connection, wherein the remote user interface document is updated by the UI server based on the UI client capabilities.

4. The method of claim 1, further comprising:
   converting the drawing primitives into a language compatible with the language of the remote user interface document at the UI client; and
   applying the converted drawing primitives to the remote user interface document.

5. The method of claim 4, further comprising:
   maintaining a mapping between drawing primitives and converted drawing primitives.

6. The method of claim 1, further comprising:
   modifying attributes of a drawing primitive previously submitted by the UI server over the second connection.

7. The method of claim 1, further comprising:
   changing property values for the remote user interface document.

8. The method of claim 1, further comprising:
   detecting an event;
   invoking an event handler in response to the event, wherein the event handler directly causes an update to the remote user interface document.

9. The method of claim 1, further comprising:
   detecting an event;
   invoking an event handler in response to the event, wherein the event handler sends a message over the second connection to the UI server causing the UI server to directly cause an update to the remote user interface document.

10. The method of claim 9, wherein the update to the remote user interface document comprises modifying one or more elements of the remote user interface document.

11. The method of claim 9, wherein the update to the remote user interface document comprises the UI server submitting, deleting or modifying the remote user interface document.

12. The method of claim 1, wherein the persistent connection remains open after an initial data transfer for subsequent data transfers.

13. A method for operating a remote user interface (UI) server, the method comprising:
    establishing a first connection with a UI client;
    sending a remote user interface document to the UI client over the first connection, wherein the remote user interface document contains executable language including first instructions on how to operate a user interface and second instructions on establishing a persistent connection with the UI client, wherein a persistent connection is a connection in which link negotiation is not required to be performed again in order to transmit subsequent data;
    closing the first connection;
    receiving a request from the UI client for a persistent connection;
    updating the remote user interface document by establishing a second connection with the UI client, wherein the second connection is a persistent connection that remains open after an initial data transfer; and
    modifying markup element properties of the remote user interface document through the second connection.

14. The method of claim 13, further comprising:
    identifying and authenticating the second connection with the UI client;
    receiving UI client capabilities from the UI client over the second connection, wherein the remote user interface document is updated by the UI server based on the UI client capabilities; and
    directly editing a DOM tree located on the UI client through the second connection.

15. The method of claim 13, wherein
    modifying markup element properties of the remote user interface document through the second connection comprises-directly-modifying markup element properties of the remote user interface document through the second connection.

16. The method of claim 13, further comprising:
    sending a script package to the UI client; and
    directly invoking the script packet over the second connection.

17. The method of claim 13, further comprising:
    receiving a message over the second connection from an event handler on the UI client notifying the occurrence of an event; and
    in response to the receiving of the message, directly editing the document on the UI client over the second connection.

18. An apparatus comprising:
    a processor;
    an interface; and
    a UI client, wherein the UI client is configured to:
        establish a first connection with a UI server via the interface;
        receive a remote user interface document over the first connection through the interface;
        close the first connection;
        run the remote user interface document by executing instructions from language contained in the document using the processor, wherein the instructions from the remote user interface document contains first instructions on how to operate a user interface and second instructions on establishing a persistent connection with the UI server, wherein a persistent connection is a connection in which link negotiation is not required to be performed again in order to transmit subsequent data; and update markup element properties of the remote user interface document by establishing a second connection with the UI server via the interface based on the second instructions, wherein the second connection is a persistent connection that remains open after an initial data transfer.

19. The apparatus of claim 18, wherein the apparatus is a display device.

20. An apparatus comprising:
a processor;
an interface; and
a UI server, wherein the UI server is configured to:
establish a first connection with a UI client via the interface;
send a remote user interface document to the UI client over the first connection through the interface, wherein the remote user interface document contains executable language including first instructions on how to operate a user interface and second instructions on establishing a persistent connection with the UI server, wherein a persistent connection is a connection in which link negotiation is not required to be performed again in order to transmit subsequent data;
close the first connection;
receive a request via the interface from the UI client for a persistent connection;
update the remote user interface document by the UI server by establishing a second connection with the UI client via the interface, wherein the second connection is a persistent connection that remains open after an initial data transfer; and
directly edit the document on the UI client by the UI server by using the processor to generate instructions that are sent over the interface, wherein markup element properties of the remote user interface document are modified through the second connection.

21. The apparatus of claim 20, wherein the apparatus is a set-top box.

22. A program storage device readable by a machine tangibly embodying a program of instructions executable by the machine to perform a method for operating a remote UI client, the method comprising:
establishing a first connection with a UI server;
receiving a remote user interface document over the first connection;
closing the first connection;
running instructions from language contained in the remote user interface document, wherein the instructions of the remote user interface document contains first instructions on how to operate a user interface and second instructions on establishing a persistent connection with the UI server, wherein a persistent connection is a connection in which link negotiation is not required to be performed again in order to transmit subsequent data; and
updating markup element properties of the remote user interface document by the UI server by establishing a second connection with the UI server based on the second instructions, wherein the second connection is a persistent connection that remains open after an initial data transfer.

23. A program storage device readable by a machine tangibly embodying a program of instructions executable by the machine to perform a method for operating a remote UI server, the method comprising:
establishing a first connection with a UI client;
sending a remote user interface document to the UI client over the first connection, wherein the remote user interface document contains executable language including first instructions on how to operate a user interface and second instructions on establishing a persistent connection with the UI server;
closing the first connection;
receiving a request from the UI client for a persistent connection, wherein a persistent connection is a connection in which link negotiation is not required to be performed again in order to transmit subsequent data; and
updating markup element properties of the remote user interface document by the remote UI server by establishing a second connection with the UI client, wherein the second connection is a persistent connection that remains open after an initial data transfer.

24. A method for operating a remote user interface (UI) client, the method comprising:
establishing a first connection with a UI server;
receiving a remote user interface document over the first connection;
closing the first connection;
running instructions from language contained in the remote user interface document, wherein the instructions of the remote user interface document contains first instructions on how to operate a user interface and second instructions on establishing a persistent connection with the UI server;
updating the remote user interface document by establishing a second connection with the UI server based on the second instructions; and
modifying attributes of a drawing primitive previously submitted by the UI server over the second connection.

25. The method of claim 24, wherein the second connection is a persistent connection that remains open after an initial data transfer.

* * * * *